(12) United States Patent
Habeck et al.

(10) Patent No.: US 10,575,458 B2
(45) Date of Patent: Mar. 3, 2020

(54) SPREADER ASSEMBLY

(71) Applicant: KUHN NORTH AMERICA, INC., Brodhead, WI (US)

(72) Inventors: Kody Habeck, Albany, WI (US); Casey Fennell, Shullsburg, WI (US); John Williams, Edgerton, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 0 days.

(21) Appl. No.: 15/210,571

(22) Filed: Jul. 14, 2016

(65) Prior Publication Data

US 2018/0014458 A1    Jan. 18, 2018

(51) Int. Cl.
| | |
|---|---|
| *A01C 17/00* | (2006.01) |
| *A01C 3/06* | (2006.01) |
| *A01C 15/00* | (2006.01) |
| *E01C 19/20* | (2006.01) |

(52) U.S. Cl.
CPC ............. *A01C 17/003* (2013.01); *A01C 3/06* (2013.01); *A01C 15/00* (2013.01); *A01C 17/001* (2013.01); *E01C 19/203* (2013.01)

(58) Field of Classification Search
CPC ....... A01C 17/001; A01C 17/003; A01C 3/06; A01C 3/066; A01M 9/0069; E01C 19/203
USPC ................................................. 239/676, 680
See application file for complete search history.

(56) References Cited

U.S. PATENT DOCUMENTS

| | | | | | |
|---|---|---|---|---|---|
| 3,070,375 | A | * | 12/1962 | Donna | A01C 3/06 222/342 |
| 3,236,527 | A | * | 2/1966 | Suyder | A01C 3/063 239/656 |
| 3,539,113 | A | * | 11/1970 | Tyler | A01C 17/001 239/667 |
| 3,749,321 | A | * | 7/1973 | Roiser | A01C 3/066 239/669 |
| 3,768,737 | A | * | 10/1973 | Tobias | A01C 17/003 239/666 |
| 4,162,766 | A | * | 7/1979 | Ten Broeck | E01H 10/007 222/135 |
| 4,340,182 | A | * | 7/1982 | Parke | A01C 3/06 239/680 |
| 4,934,606 | A | * | 6/1990 | Grataloup | A01C 17/003 222/281 |
| 5,501,404 | A | * | 3/1996 | Meyer | A01C 3/066 111/11 |
| 6,508,419 | B1 | * | 1/2003 | Kinkead | A01C 15/122 239/661 |

(Continued)

*Primary Examiner* — Alex M Valvis
(74) *Attorney, Agent, or Firm* — Oblon, McClelland, Maier & Neustadt, L.L.P.

(57) ABSTRACT

A spreader assembly to distribute materials on a ground surface, including a container to hold the materials, a frame affixed to the container, a beater assembly supported by the frame that receives the materials from the container and processes the materials to obtain processed materials, and a spinner assembly that receives the processed materials and expulses the processed materials from the frame onto the ground surface. The beater assembly includes a pair of rotating elements that blends the materials to produce the processed materials, and a deflector located between the pair of rotating elements configured to prevent the formation of agglomerates in the processed materials.

20 Claims, 10 Drawing Sheets

(56) References Cited

U.S. PATENT DOCUMENTS

2003/0192967 A1* 10/2003 Rissi ................. E01C 19/203
  239/667
2005/0252999 A1* 11/2005 Truan ................. A01C 15/006
  239/661

* cited by examiner

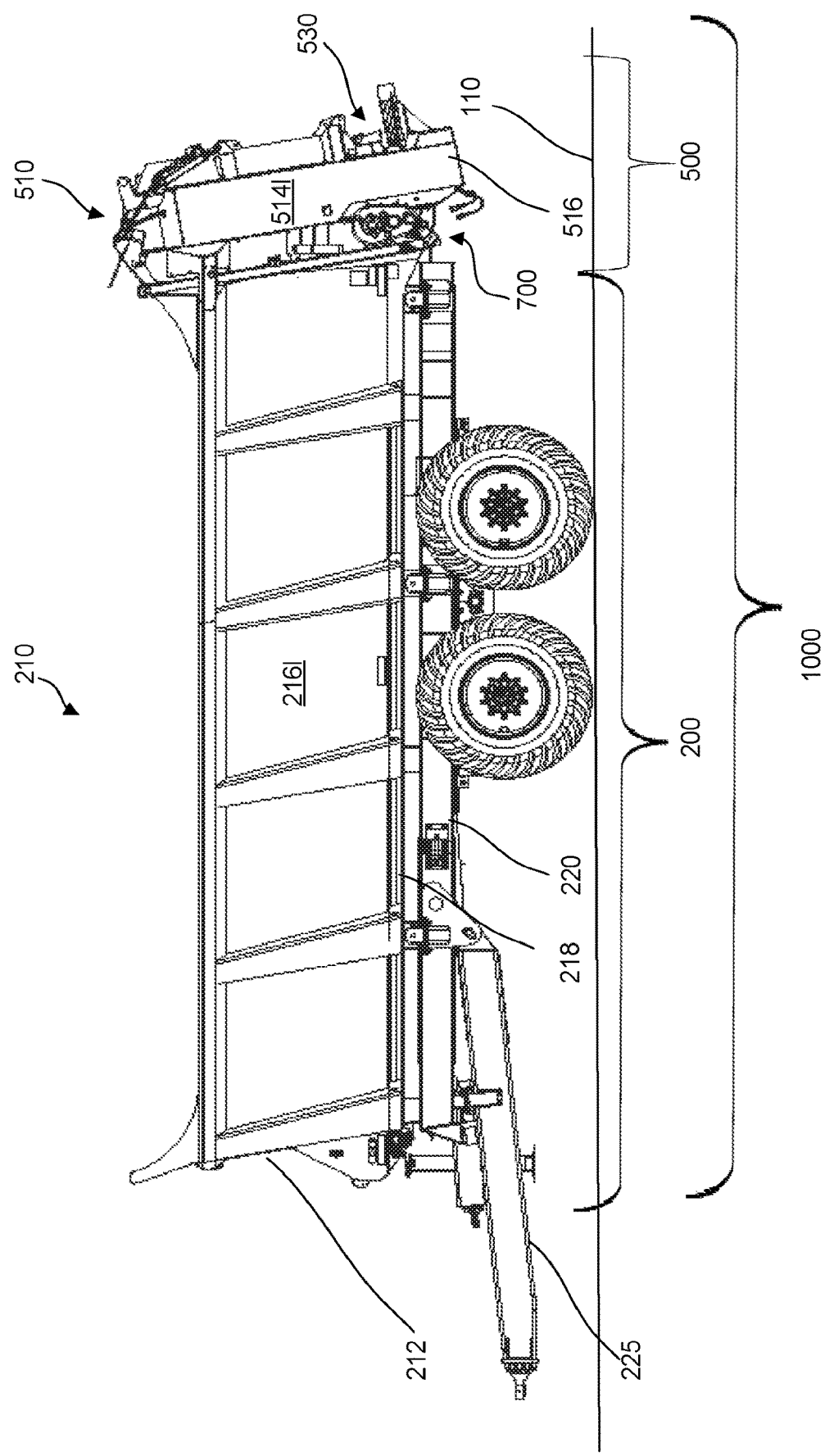

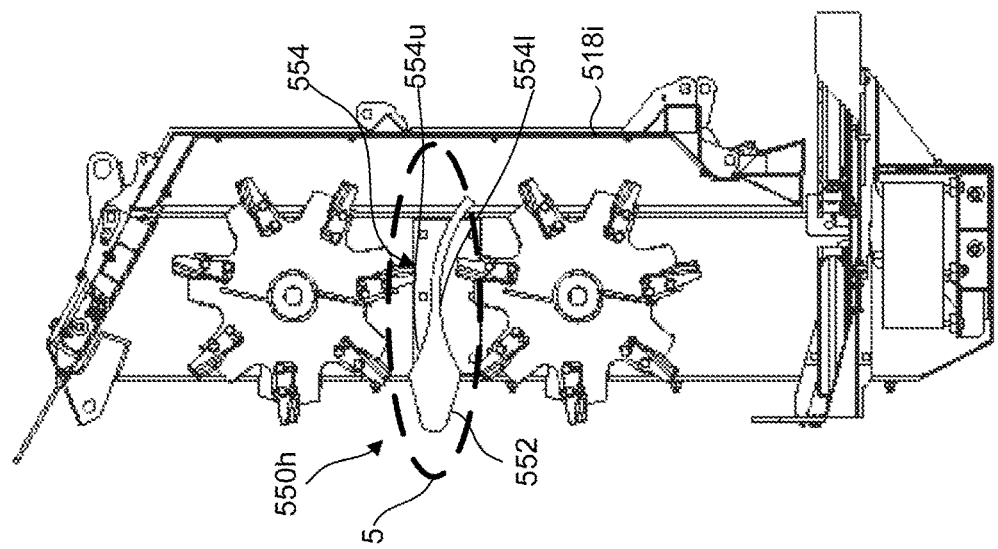
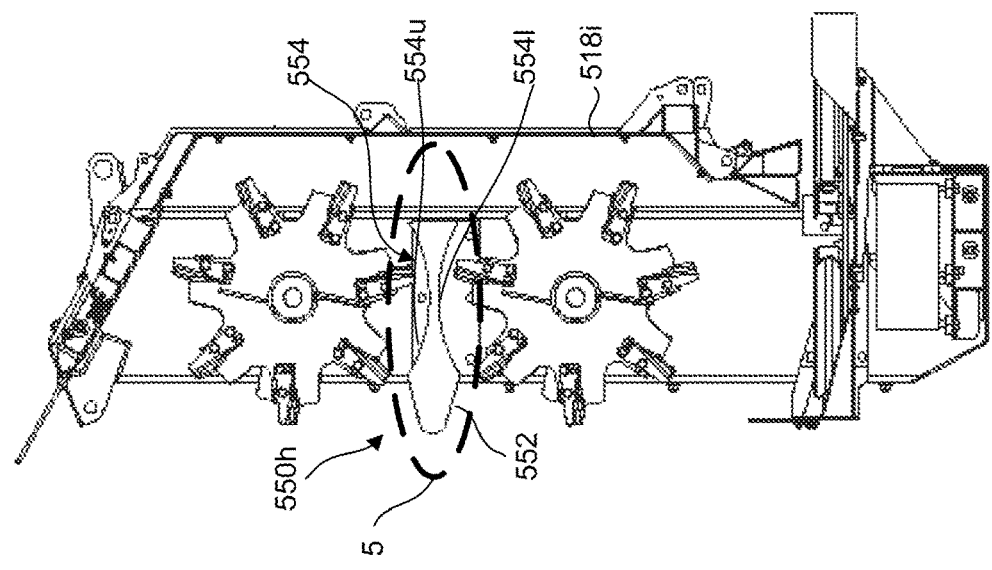
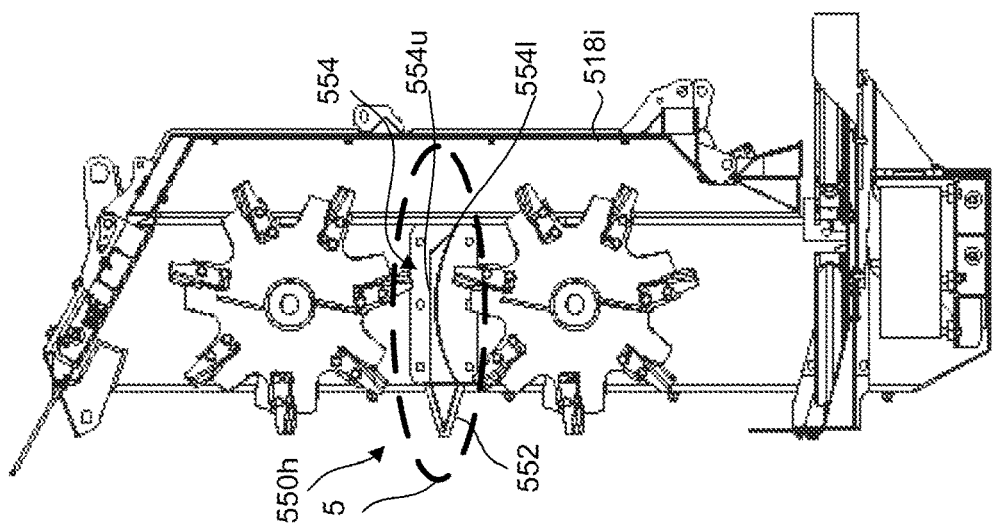

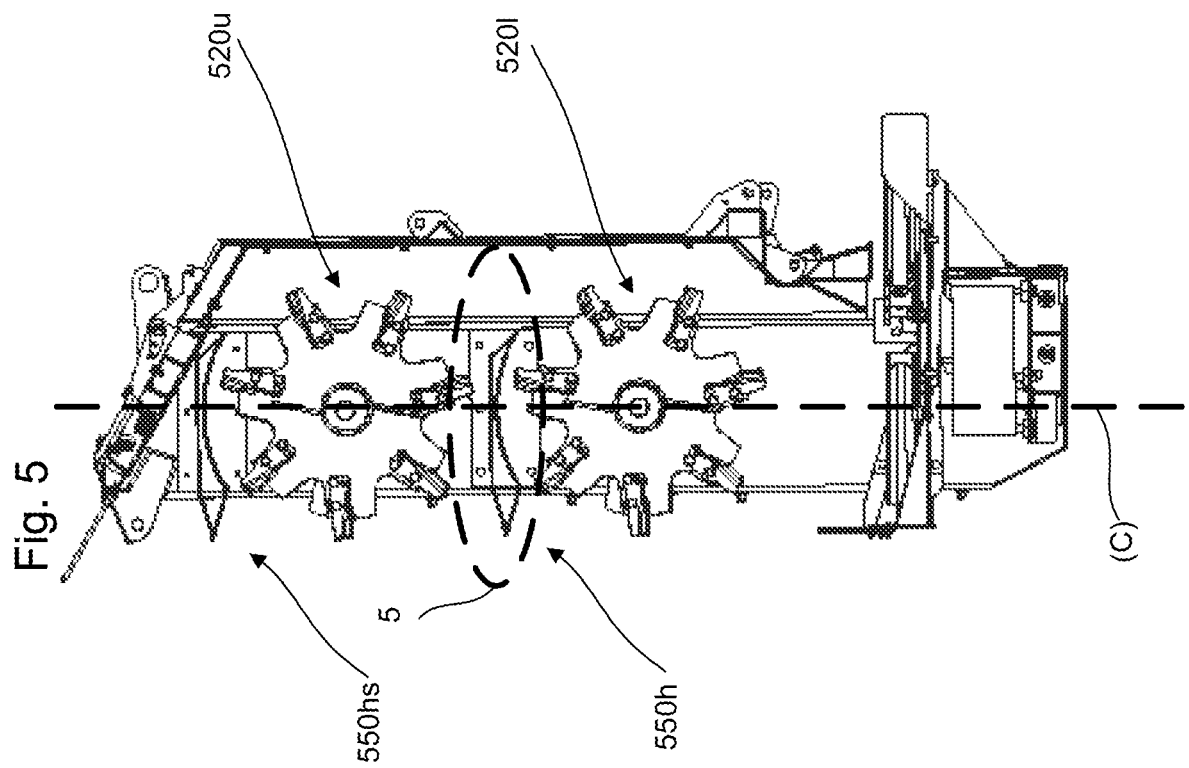

SPREADER ASSEMBLY

BACKGROUND

Field of the Disclosure

The present disclosure relates to agricultural equipment for material distribution. More precisely, the present application relates to spreader assembly including spreader module for distributing materials, e.g., nutrients, organic matter, or soil additive, on a ground surface, e.g., a field.

Description of the Related Art

Distributing materials, such as soil nutrients, organic matter, on a ground surface, such as a field, is a crucial part in fertilizing and more generally in soil preparation. For this task, conventional spreaders rely on rotating elements that process the materials, and expulse the processed materials on the ground surface.

Although such conventional spreaders are widely used they present important drawbacks.

Notably, when the materials are processed, agglomerates of materials may appear inside dead zones 5 that may be located between and/or around each rotating element 10, as shown in FIG. 1. The presence of these agglomerates may lead to abrupt discharges of the processed materials, and surges of processed materials may be expulsed from the spreader. These surges lead to a non-uniform distribution of the processed materials onto the ground surface that is undesirable as it results in varying concentrations of nutrients, organic matter, or soil additives.

Thus, a spreader assembly solving the aforementioned limitations of non-uniform distribution of the processed materials is desired.

SUMMARY OF THE DISCLOSURE

Accordingly, the object of the present disclosure is to provide a spreader assembly which overcomes the above-mentioned limitations of non-uniform distribution of the processed materials on the ground surface.

The spreader assembly of the present disclosure ensures a uniform distribution of the processed materials due to structures that improve the processing and blending of the materials and provide a substantially homogeneous consistency for the processed materials. Thus, the processed materials can be uniformly distributed on the ground surface.

Notably, these structures correspond to deflectors that prevent the formation of agglomerates of materials by restricting the flow of materials from entering dead zones where build-ups are present. For example, these dead zones may be located between and/or around the rotating elements that process and blend the materials.

In one non-limiting illustrative example, a spreader assembly to distribute materials on a ground surface is presented. The spreader assembly includes a container to hold the materials; a frame affixed to the container; a beater assembly supported by the frame that receives the materials from the container and processes the materials to produce processed materials, the beater assembly including, a pair of rotating elements that blends the materials to produce the processed materials; and a deflector located between the pair of horizontal rotating elements configured to prevent the formation of agglomerates in the processed materials; and a spinner assembly that receives the processed materials and expulses the processed materials from the frame onto the ground surface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A is a side view of a spreader assembly, according to certain aspects of the disclosure;

FIG. 4C is a sectional view of the horizontal spreader module with the horizontal deflector in a third configuration, according to certain aspects of the disclosure;

FIG. 4D is a sectional view of the horizontal spreader module with the horizontal deflector in the fourth configuration, according to certain aspects of the disclosure;

FIG. 4E is a sectional view of the horizontal spreader module with the horizontal deflector in the fifth configuration, according to certain aspects of the disclosure;

FIG. 5 is a sectional view of the horizontal spreader module with a supplementary horizontal deflector, according to certain aspects of the disclosure;

DETAILED DESCRIPTION

Figure 1:
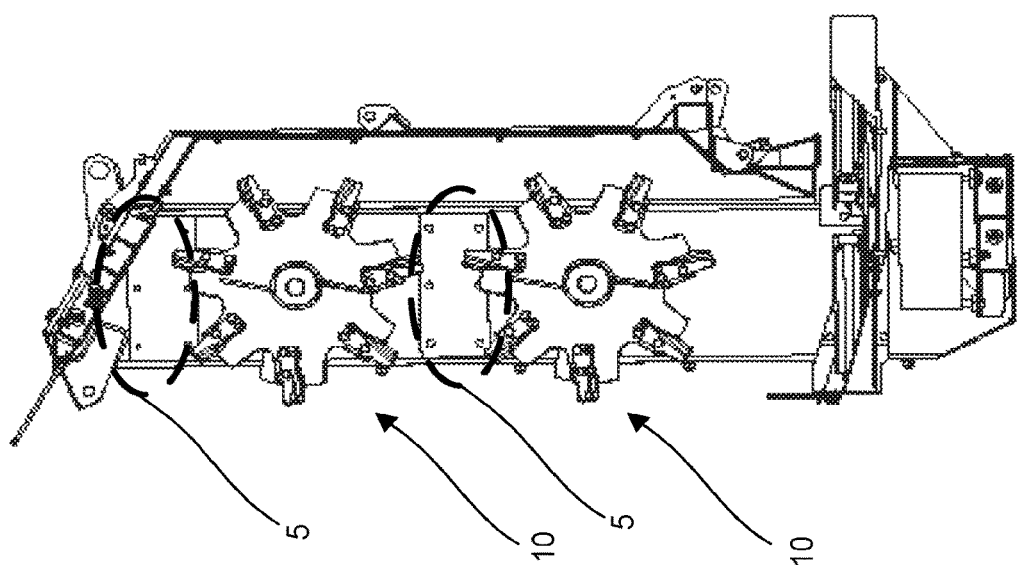
FIG. 1 is a sectional view of a conventional spreader module.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 2B:
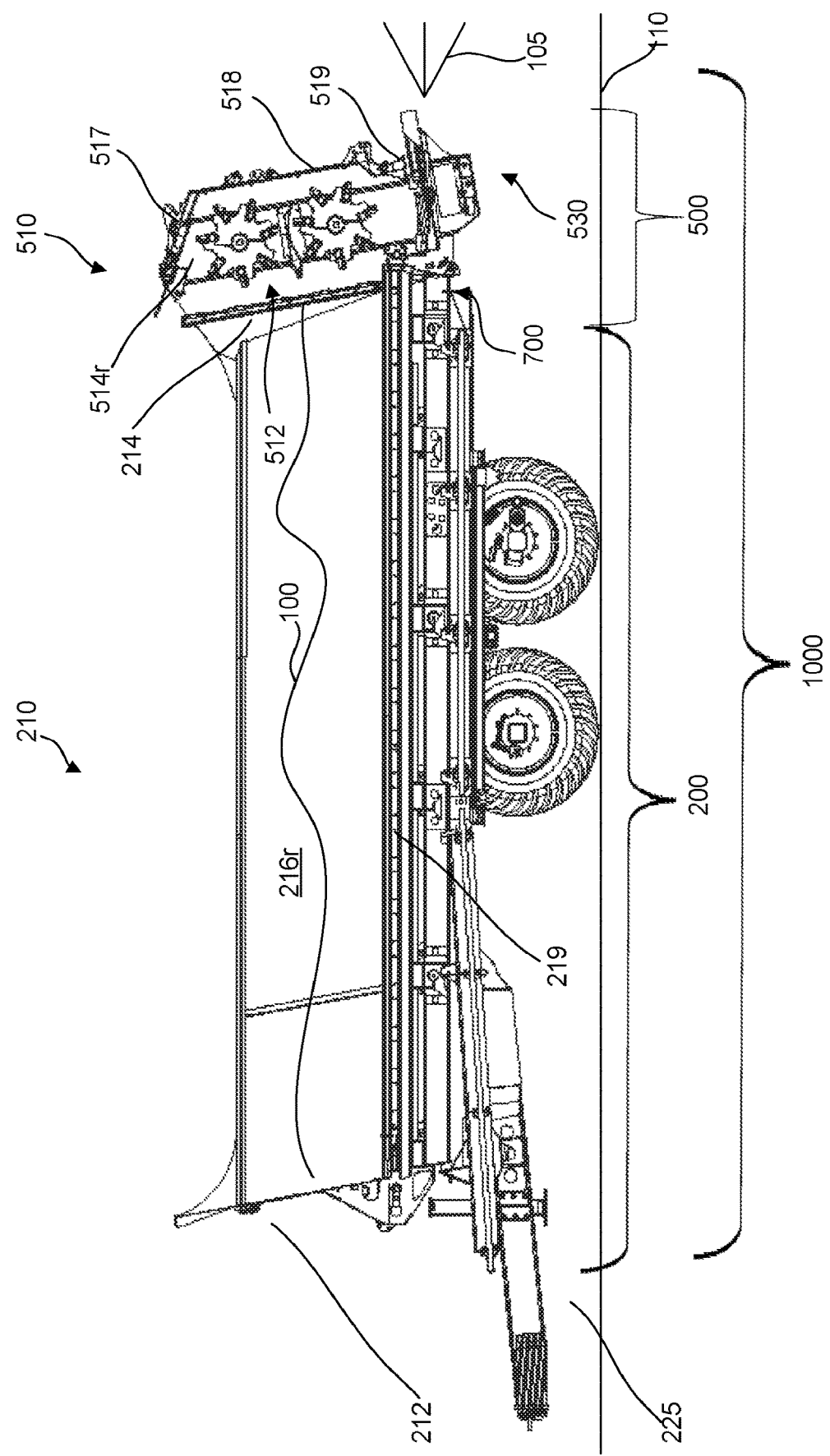
FIG. 2B is a sectional view of the spreader assembly, according to certain aspects of the disclosure.

FIGS. 2A-2B are a side view and a sectional view of a spreader assembly 1000, according to certain aspects of the disclosure.

The spreader assembly 1000 may include a container 200, a horizontal spreader module 500 affixed to the container 200, and a drive system 700 that drives the horizontal spreader module 500.

The container 200 stores materials 100 used for soil preparation or fertilization, e.g., soil nutrient, organic matter, or soil additive, and feeds the materials 100 to the horizontal spreader module 500.

The horizontal spreader module 500 receives the materials 100 from the container 200, processes the materials 100 to obtain processed materials 105, and distribute the processed material 105 on a ground surface 110, e.g., field, by expulsing the processed materials 105 through a discharge slot 519 open on the ground surface 110.

The container 200 may include a dump body 210 to hold the materials 100, and a trailer 220 to support and haul the dump body 210 on the ground surface 110 by a vehicle, e.g., tractor or truck, via a tongue 225.

The container 200 may include a front panel 212 opposite a tailgate 214, a right panel 216*r* opposite a left panel 216*l*, and a floor 218 that supports the front panel 212, the tailgate 214, the right panel 216*r*, and the left panel 216*l*.

Alternatively, the floor 218 may include a conveyor 219 to bring the materials 100 to the tailgate 214 and to supply the horizontal spreader module 500 with the materials 100. The conveyor 219 may extend along a length of the floor 218 between the front panel 212 and the horizontal spreader module 500.

As used herein, the term "front" refers to the region of the spreader assembly 1000 closest to the front panel 212 of the dump body 210, the term "rear" refers to the region of the spreader assembly 1000 closest to the discharge slot 519 of the horizontal spreader module 500, the term "right" refers to the region of the spreader assembly 1000 closest to right panel 216*r* of the dump body 210 and the term "left" refers to the region of the spreader assembly 1000 closest to the left panel 216*l* of the dump body 210.

The horizontal spreader module 500 may be affixed to a rear portion of the dump body 210 and may protrude from the container 200 in a rearward direction.

The horizontal spreader module 500 is configured to receive the materials 100 from the dump body 210, to process the materials 100 and obtain the processed materials 105 with a substantially homogeneous consistency, to expulse the processed materials 105 in a backward direction, and to distribute the processed materials 105 on the ground surface 110 in a substantially uniform way.

Particularly, the horizontal spreader module 500 is configured to prevent the formation of agglomerates in the processed materials 105, and to prevent abrupt discharges of the materials 100 which are not processed onto the ground surface 110.

The drive system 700 may be configured to power the horizontal spreader module 500 and may be powered hydraulically, pneumatically, electrically or mechanically via a power takeoff. For example, the drive system 700 may include an electrical motor, a hydraulic motor, a gear box, a rotatory actuator or the combination thereof. Further, the drive system 700 may be manually controlled by a user or automatically controlled by a controller.

Figure 3:
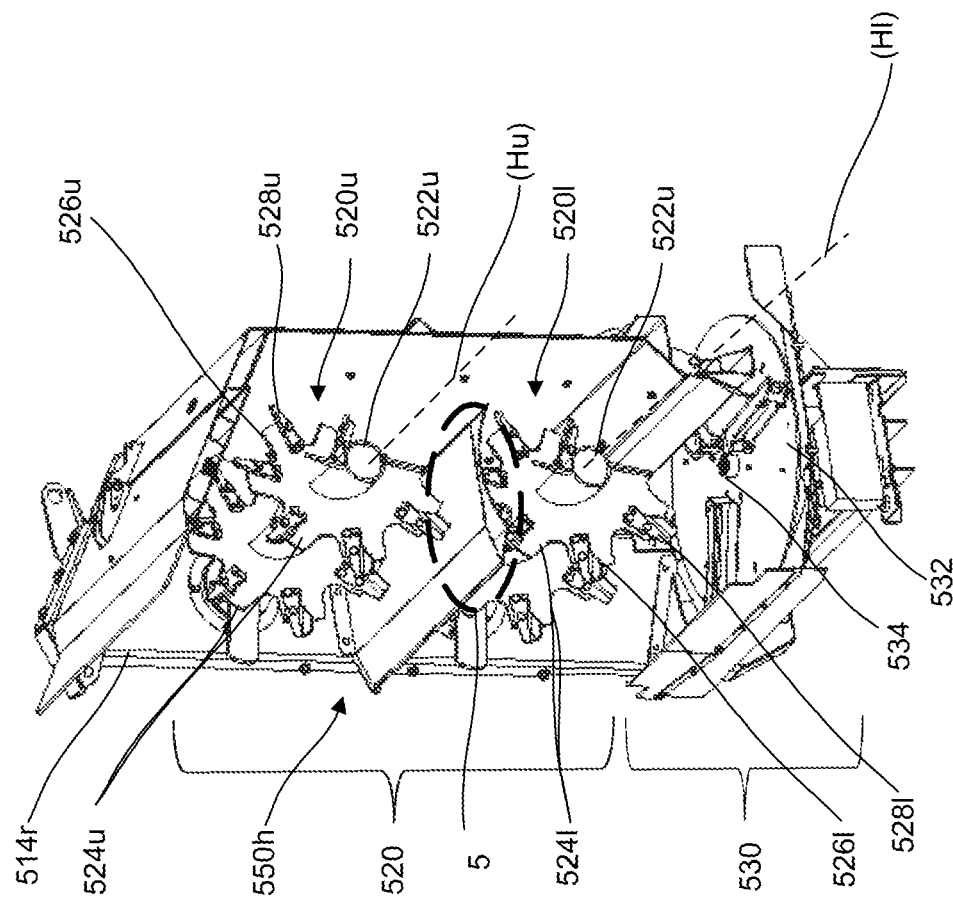
FIG. 3 is a sectional perspective view of a horizontal spreader module of the spreader assembly, according to certain aspects of the disclosure.

FIG. 3 is a sectional perspective view of a horizontal spreader module 500 of the spreader assembly 1000, according to certain aspects of the disclosure.

The horizontal spreader module 500 may include, a beater assembly 520 to process the materials 100 and provide the processed materials 105, a spinner assembly 530 to receive the processed materials 105 and expulse the processed materials 105, and a frame 510 to provide fixation to the dump body 210 and support to the beater assembly 520 and the spinner assembly 530.

The frame 510 may include an opening 512 that faces the tailgate 214, a right side panel 514*r* affixed to the right side 216*r* of the dump body 210, a left side panel 514*l* affixed to the left side 216*l* of the dump body 210, a top support 517 that extends between a top part of the right side panel 514*r* and a top part of the left side panel 514*l*, and a pan 516 that extends between a bottom part of the right side panel 514*r* and a bottom part of the left side panel 514*l*.

In addition, the frame 510 may include a back side panel 518 that partially covers the pair of side panels 514 and forms the discharge slot 519, wherein the discharge 519 opens on the spinner assembly 530.

The right side panel 514*r*, the left side panel 514*l*, and the back side panel 518 channel the materials 100 from the tailgate 214 to the beater assembly 520 to be processed, and channel the processed materials 105 from the beater assembly 520 to the spinner assembly 530 to be distributed on the ground surface 110 through the discharge slot 519.

The beater assembly 520 may include an upper rotating member 520*u* that rotates around an upper horizontal axis (Hu) and a lower rotating member 520*l* that rotates around a lower horizontal axis (Hl). The upper axis (Hu) and the lower axis (Hl) may lay on a center plane (C) that passes through the top support 517 and the pan 516 and be parallelly placed on top of each other.

The upper rotating member 520*u* may include an upper shaft 522*u* with a plurality of upper processing members 524*u* affixed along a length of the upper shaft 522*u* and protruding radially from to the upper shaft 522*u*.

The plurality of upper processing members 524*u* is configured to grab, break-up, and blend the materials 100 in order to process the materials 100.

Each upper processing member of the plurality of upper processing members 524*u* may include a plurality of upper teeth 526*u*, wherein each upper tooth of the plurality of upper teeth 526*u* may be reinforced by an upper claw 528*u* affixed on each upper processing member 524*u*.

Similarly to the upper rotating member 520*u*, the lower rotating member 520*l* may include a lower shaft 522*l* with a plurality of lower processing members 524*l* affixed along a length of the lower shaft 522*l* and protruding radially from to the lower shaft 522*l*.

The plurality of lower processing members 524*l* is configured to grab, break-up, and blend the materials 100 in order to process the materials 100.

Each lower processing member of the plurality of lower processing members 524*l* includes a plurality of lower teeth 526*l*, wherein each lower tooth of the plurality of lower teeth 526*l* may be reinforced by a lower claw 528*l* affixed on each lower processing member 524*l*.

The spinner assembly 530 may be located below the lower rotating member 520*l* to receive the processed materials 105 from the beater assembly 520.

The spinner assembly 530 may include a pair of spinner discs 532 that lays on the pan 516 between the right side panel 514*r* and the left side panel 514*l*, and protrudes from the pan 516 in a backward direction. Each spinner disc of the pair of discs 532 rotates around a spinner shaft 534 that may be tilted in a forward direction.

Each spinner disc 532 may include a plurality of spinner blades 536 affixed on the spinner disc 532 and protruding from the spinner disc 532 towards the lower rotating member 520*l*. The spinner blades 536 may protrude perpendicularly from the spinner disc 532. The spinner blades 536 may also protrude radially from the center of the spinner shaft 534.

In addition, the beater assembly 520 may include a horizontal deflector 550*h* that is located between the upper rotating member 520*u* and the lower rotating member 520*l* and extends along a length of the upper rotating member 520*u* and lower rotating member 520*l*.

The horizontal deflector 550*h* is configured to improve the break-up and blending of the materials 100 and to homogenize the processed materials 105. The horizontal deflector 550*h* also improves the uniformity that the materials 100 are distributed to the spinner assembly 530.

Under the action of the drive system 700, the upper rotating member 520*u* and the lower rotating member 520*l* rotate in a clockwise direction, as viewed from the left, to force the materials 100 through the upper rotating member 520*u* and the lower rotating member 520*l* and around the horizontal deflector 550*h* to produce the processed materials 105.

The rotation of the upper rotating member 520*u* and the lower rotating member 520*l* pushes the materials 100 against an internal surface 518*i* of the back side panel 518 and the internal surface 518*i* channels the processed materials 100 to the spinner assembly 530 in an upstream to downstream direction.

Each spinner disc 532 receives the processed materials 105 from the beater assembly 520 and pushes the processed materials 105 in an outward and radial direction under the action of the drive system 700 that rotates each spinner disc 532. The spinner assembly 530 expulses the processed materials 105 onto the ground surface 110 through the discharge slot 519.

The passage of the materials 100 around the horizontal deflector 550*h* prevents the formation of agglomerates in the processed materials 105 by deflecting and/or restricting the materials 100 from entering dead zones wherein build-ups may happen.

For example, these dead zones may be located between the upper rotating element 520*u* and the lower rotating element 520*l* and/or at the periphery of the upper rotating element 520*u* and the lower rotating element 520*l*.

FIGS. 4A-4E are sectional views of the horizontal deflector 550*h* in a first configuration, in a second configuration, in a third configuration, in a fourth configuration, and in a fifth configuration, according to certain aspects of the disclosure.

The horizontal deflector 550*h* may include a head 552, located between the upper rotating member 520*u* and the lower rotating member 520*l*, that extends between the right side panel 514*r* and the left side panels 514*l* and between the opening 512 of the frame 510 and the center plane (C) containing the upper axis (Hu) and the lower axis (Hl).

The head 552 may have a cross section configured to deflect and/or restrict the materials 100 from entering the dead zones and to homogenize the processed materials 105.

Figure 4B:
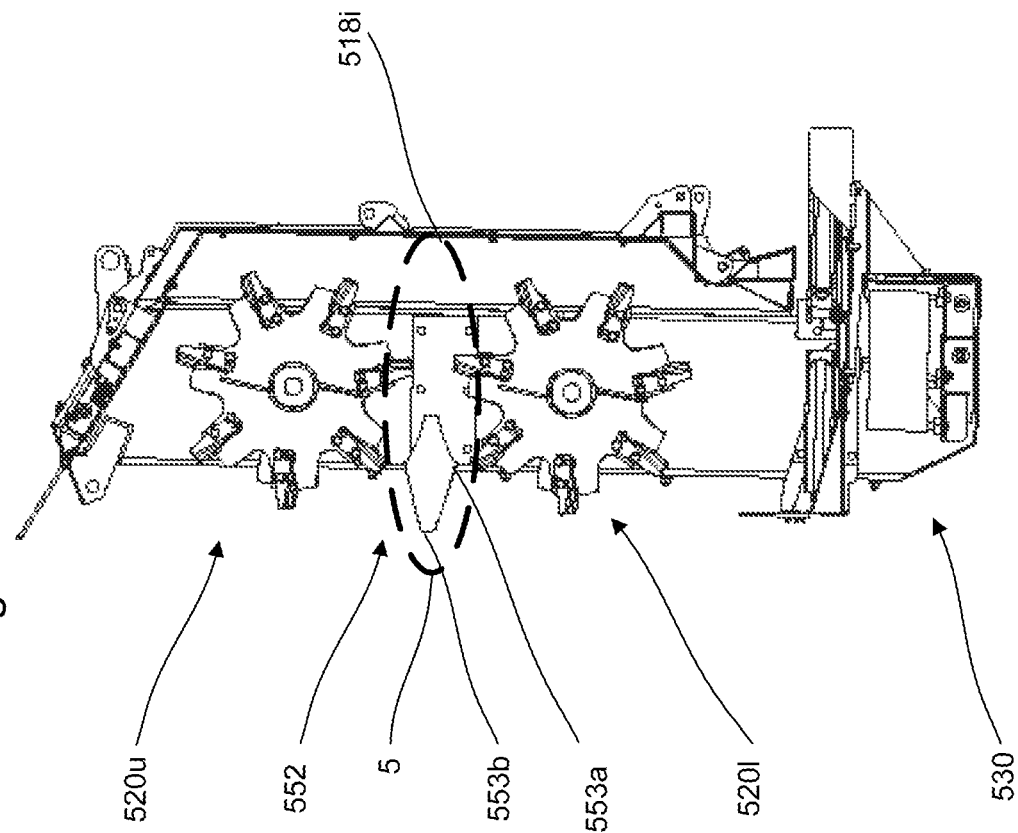
FIG. 4B is a sectional view of the horizontal spreader module with the horizontal deflector in a second configuration, according to certain aspects of the disclosure.
Figure 4A:
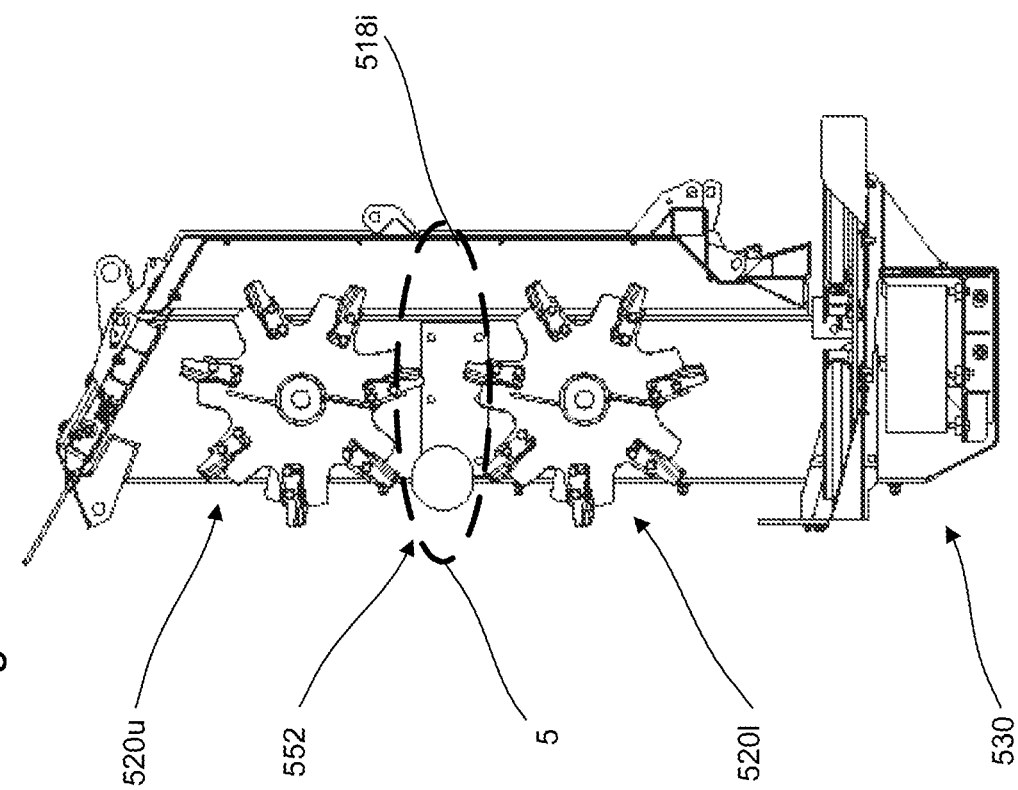
FIG. 4A is a sectional view of the horizontal spreader module with a horizontal deflector in a first configuration, according to certain aspects of the disclosure.

For example, the head 552 may have a spheroidal cross section, as illustrated in FIG. 4A, a rectangular cross section, a triangular cross section, a lozenge-shaped cross section, as illustrated in FIG. 4B, or any combination thereof. The different cross section shapes may be configured to block the passages of agglomerates between the upper rotating member 520*u* and the lower member 520*l*.

The head 552 may include sharp edges 553*a* pointing towards the container 200 and/or the upper rotating member 520*u* and the lower rotating member 520*l*, as illustrated in FIG. 4B, and/or rounded edges 553*b* pointing in a forward direction, as illustrated in FIG. 4B, or any combination thereof. The sharp edges 553*a* may be configured to cut agglomerates of materials 100.

In addition, the horizontal deflector 550*h* may include a tail 554 that extends between the right side panel 514*r* and the left side panel 514*l* and protrudes from the head 552 in a rearward direction.

The tail 554 is configured to further deflect the materials 100 and guide the materials 100 toward the spinner assembly 530.

The tail 554 may include a lower trailing surface 554*l* that faces the lower rotating member 520*l* and an upper trailing surface 554*u* that faces the upper rotating member 520*u*.

The upper trailing surface 554*u* may have a flat shape, as illustrated in FIG. 4C, a convex shape that follows a curvature of the plurality of upper processing members 524*u* to deflect the materials 100 towards the upper rotating member 520*u*, as illustrated in FIG. 4D, a concave shape that follows the plurality of lower processing members 524*l* to deflect the materials 100 towards the spinner assembly 530, as illustrated in FIG. 4E, or any combination thereof.

Similarly to the upper trailing surface 554*u*, the lower trailing surface 554*l* may have a flat shape, a convex shape that follows the curvature of the plurality of upper processing members 524*u* to allow relief to the materials 100 being processed by the lower rotating member 520*l*, a concave shape that follows the plurality of lower processing members 524*l* and is parallel to the upper trailing surface 554*u* to deflect the material 100 towards the lower rotating member 520*l* and the spinner assembly 530, as illustrated in FIG. 4E, or any combination thereof.

Alternatively, the shape of the head 552 may be designed based on physical characteristics of the materials 100, e.g., texture, structure, solidity, permeability, temperature. For example, for very solid and resistant materials 100, the head 552 may have an elongated shape to easily deflect the materials 100 and provide rigidity. For weak and easily fracturable materials 100, the head 552 may have a voluminous shape, e.g., a spherical shape, to limit the space between the upper rotating member 520*u* and the lower rotating member 520*l*.

Alternatively, the shapes of the tail 554, the lower trailing surface 554*l*, and the upper trailing surface 554*u* may be designed to adjust, e.g., increase/decrease, the flow of materials 100 between the upper rotating member 520*u* and the lower rotating member 520*l* and adjust the recycling of materials 100 around the upper rotating member 520*u* and the lower rotating member 520*l*. For example, to increase the flow of materials 100 the tail 554 can have a shape tapered toward the spinner assembly 530, while to increase the recycling of materials 100 the tail 554 can have a shape that follows the curvature of the upper rotating member 520*u* and/or the lower rotating member 520*l*, as illustrated in FIG. 4D.

In addition, the presence of a sharp point or surface on the head 552 and/or on the tail 554 and near the tangent spaces of the upper rotating member 520*u* and the lower rotating member 520*l* can generate a shear point or surface that facilitates the processing of the materials 100.

FIG. 5 is a sectional view of the horizontal spreader module 500 with a supplementary horizontal deflector 550*hs*, according to certain aspects of the disclosure.

In another non-limiting illustrative example, the beater assembly 520 may include a supplementary horizontal deflector 550*hs*, located between the upper rotating member 520*u* and the top support 517 of the frame 510 and extends along the length of the upper rotating member 520*u* and lower rotating member 520*l*.

Similarly to the horizontal deflector 550*h*, the supplementary horizontal deflector 550*hs* is configured to prevent the formation of agglomerates that may be present between the upper rotating member 520*u* and the top support 517.

The supplementary horizontal deflector 550*hs* may include the same elements as the horizontal deflector 550*h*, e.g., the head 552, the tail 554 with the upper trailing surface 554*u* and the lower trailing surface 554*l* with the same features, e.g., the head 552 may have a spheroidal cross section, a rectangular cross section, a lozenge-shaped cross section, or any combination thereof, and the upper trailing surface 554*u* and the lower trailing surface 554*l* may be convex, concave, flat or any combination thereof.

In addition, the supplementary horizontal deflector 550*hs* may be parallel to the horizontal deflector 550*h* and be vertically aligned with the horizontal deflector 550*h*.

Figure 6:
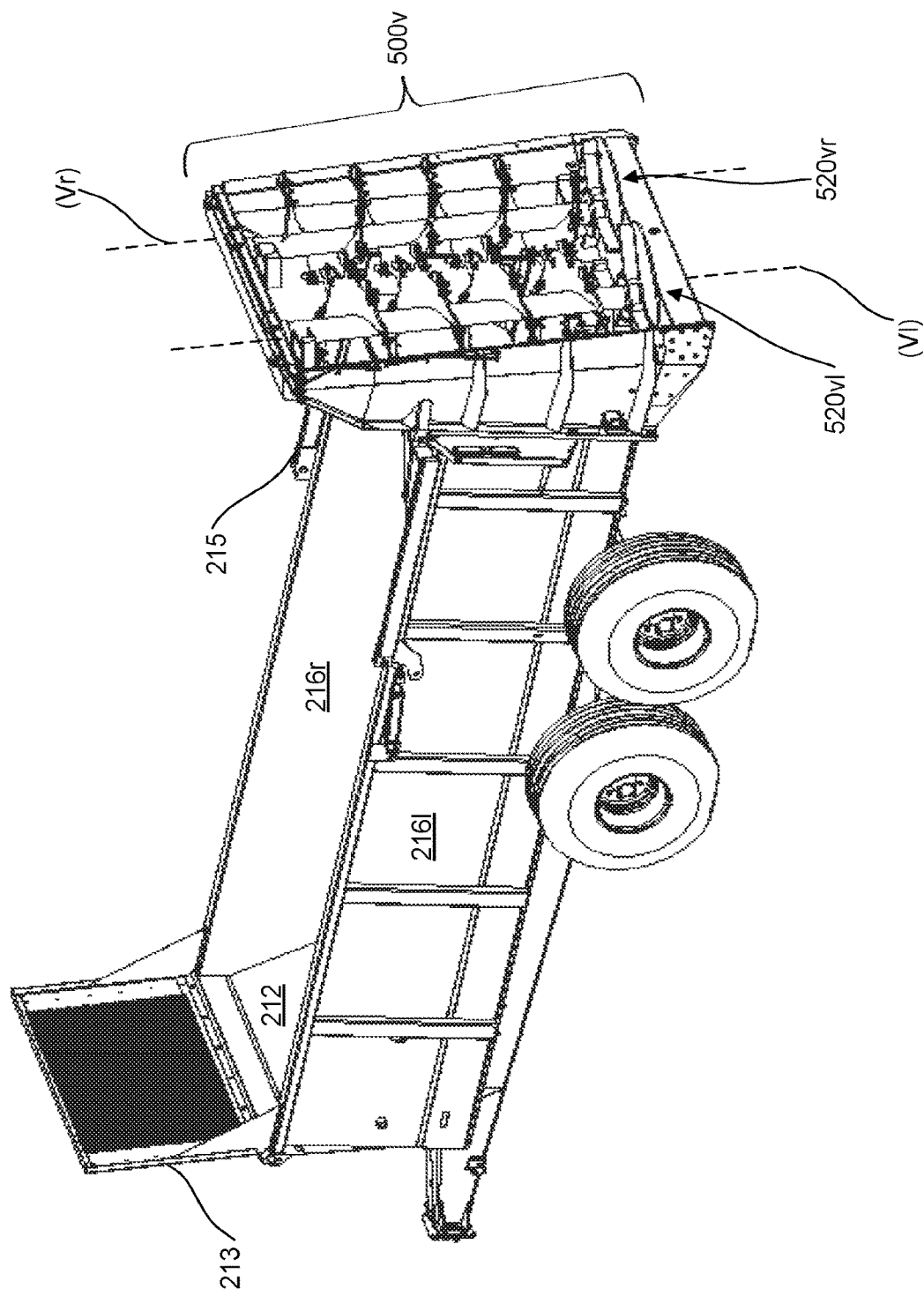
FIG. 6 is a perspective view of the spreader assembly with a vertical spreader module, according to certain aspects of the disclosure.

FIG. 6 is a perspective view of the spreader assembly 1000 with a vertical spreader 500*v*, according to certain aspects of the disclosure.

In another non-limiting illustrative example, the spreader assembly 1000 may include a vertical spreader module 500*v*, instead of the horizontal spreader module 500, affixed to the container 200.

Alternatively, the dump body 210 may include a front protective panel 213 that protects the vehicle hauling the spreader assembly 1000. In addition, the dump body 210 may include a linkage 215 to close the tailgate 214 and control the flow of the materials 100 entering the vertical spreader module 500*v*.

Figure 7:
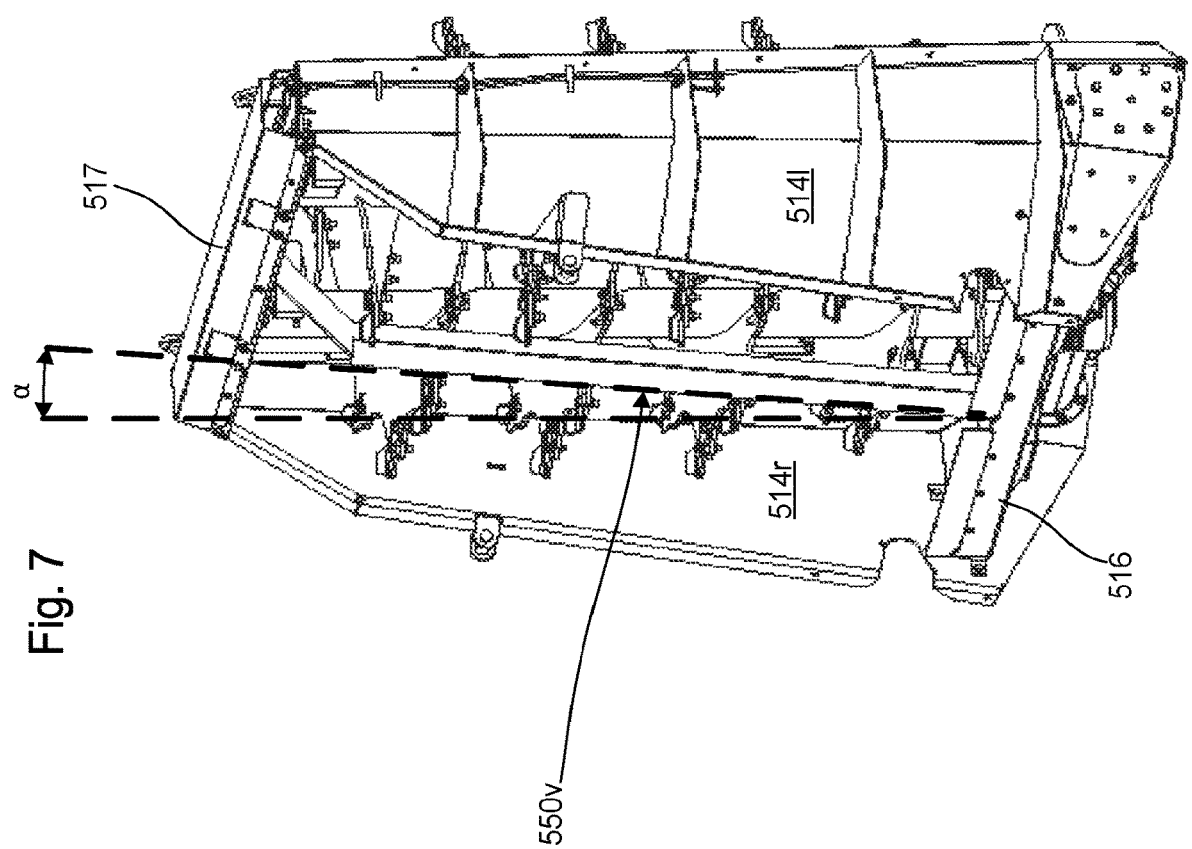
FIG. 7 is a perspective view of the vertical spreader module, according to certain aspects of the disclosure.

FIG. 7 is a perspective view of the vertical spreader module 500*v*, according to certain aspects of the disclosure.

The vertical spreader module 500*v* may include a spinner spreader assembly 520*v*, in place of the beater assembly 520 and the spinner assembly 530, as previously described for the horizontal spreader module 500. The vertical spreader assembly 520*v* may be supported by the frame 510 that is affixed to the rearward portion of the dump body 210, as it was the case for the horizontal spreader module 500.

The vertical spreader beater assembly 520*v* may include a right rotating member 520*vr* and a left rotating member 520*vl* rotatory affixed to the top support 517 of the frame 510 and to the pan 516 of the frame 510. Under the action of the drive system 700, the right rotating member 520*vr* rotates around a right vertical axis (Vr) and the left rotating member 520*vl* rotates around a left vertical axis (Vl), wherein the right vertical axis (Vr) and the left vertical axis (Vl) lay on a center plane (C) that passes through the top support 517 and the pan 516.

The right rotating member 520*vr* may include a right processing surface 524*vr* and a right spinner disc 532*r*. The right processing surface 524*vr* spirals in counter-clockwise fashion from a top end of the right rotating member 520*vr* up to a bottom end of the right rotating member 520*vr*, where the right spinner disc 532*r* is located.

The right processing surface 524*vr* may include a plurality of right teeth 526*vr* placed radially along the right processing surface 524*vr* with each right tooth of the plurality of right teeth 526*vr* being reinforced by a right claw 528*vr*.

The right spinner disc 532*r* may include a plurality of right spinner blades 536*r* affixed radially on the right spinner disc 532*r* and protruding perpendicularly from the right spinner disc 532*r* towards the top support 517.

Similar to the right rotating member 520*vr*, the left rotating member 520*vl* may include a left processing surface 524*vl* and a left spinner disc 532*l*. The left processing surface 524*vl* spirals in clockwise fashion from a top end of the left rotating member 520*vl* up to a bottom end of the left rotating member 520*vl*, where the left spinner disc 532*l* is located.

The left processing surface 524*vl* may include a plurality of left teeth 526*vl* placed radially along the left processing surface 524*vl* with each left tooth of the plurality of left teeth 526*vl* being reinforced by a left claw 528*vl*.

The left spinner disc 532*l* may include a plurality of left spinner blades 536*l* affixed radially on the left spinner disc 532*l* and protruding perpendicularly from the left spinner disc 532*l* towards the top support 517.

The vertical spreader module 500*v* may include a vertical deflector 550*v* that extends from the top support 517 to the pan 516 and protrudes from the center plane containing the right vertical axis (Vr) and the left vertical axis (Vl) towards the front of the spreader assembly 1000.

Under the action of the drive system 700 the right rotating member 520*vr* and the left rotating member 520*vl* rotates in counter-rotating fashion to force the materials 100 through the right processing surface 524*vr*, the left processing surface 524*vl*, and around the vertical deflector 550*v* to produce the processed materials 105, and to expulse the processed materials 105 onto the ground surface 110.

The drive system 700 may drive the right rotating member 520*vr* in counter-clockwise rotation and the left rotating member 520*vl* in clockwise rotation.

The right spinner disc 532*r* and the left spinner disc 532*l* receive a portion of the processed materials 105 that is moved along the right rotating member 520*vr* and the left rotating member 520*vl* and expulses the processed materials 105 on the ground surface 110.

Figure 8A:
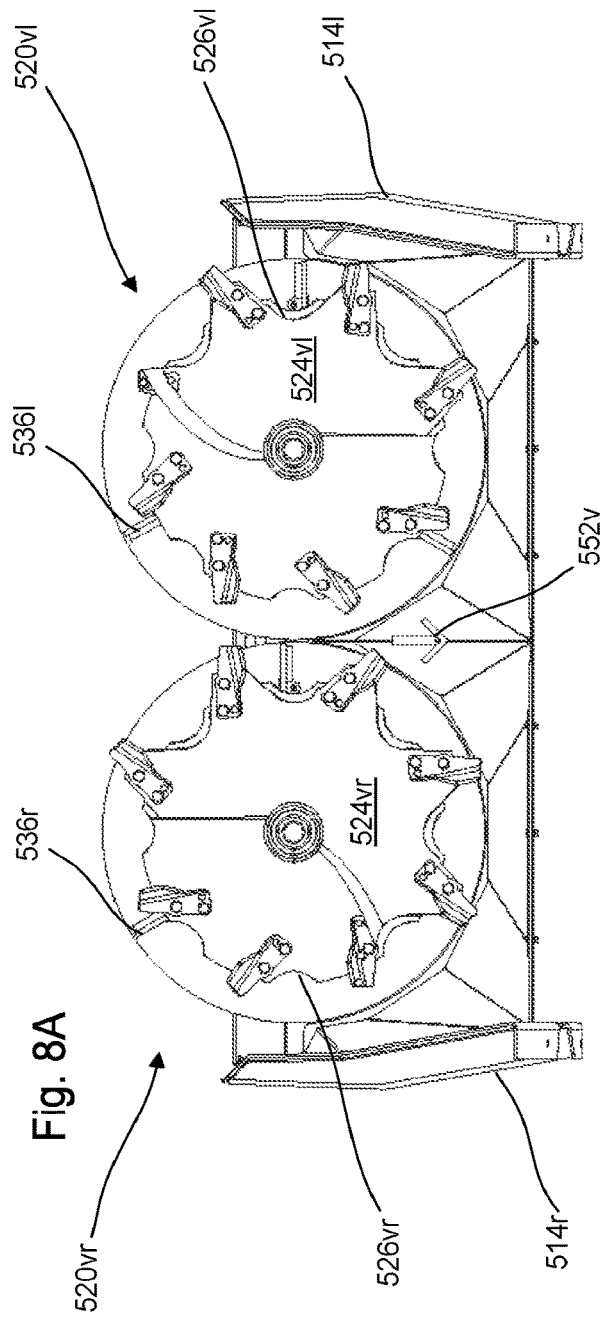
FIG. 8A is a sectional view of the vertical spreader module with a vertical deflector in a first configuration, according to certain aspects of the disclosure.
Figure 8B:
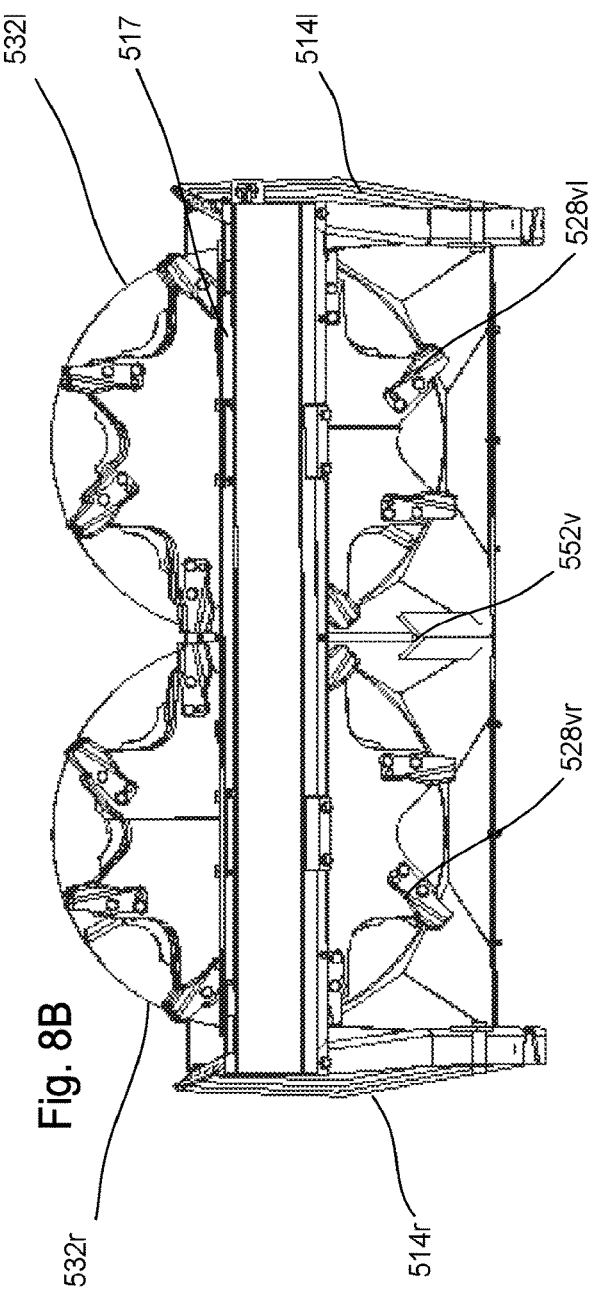
FIG. 8B is a top view of the vertical spreader module with the vertical deflector in a second configuration, according to certain aspects of the disclosure.

FIGS. 8A-8B are a sectional view of the vertical spreader module 500*v* with the vertical deflector 550*v* in a first configuration and a top view of the vertical spreader module 500*v* with the vertical deflector 550*v* in a second configuration, according to certain aspects of the disclosure.

The vertical deflector 550*v* may include a front trailing surface 552*v* configured to deflect and/or restrict the materials 100 from entering the dead zones, located between the right rotating member 520*vr* and the left rotating member 520*vr*, and to homogenize the processed materials 105.

For example, the front trailing surface 552*v* may protrude from the pan 516 along a height of the vertical spreader module 500*v* and have a V-shaped cross section that points towards the tailgate 214 of the dump body 210.

The front trailing surface 552*v* may protrude substantially perpendicularly to the pan 516, as illustrated in FIG. 8A, or in a tilted fashion towards the back of the spreader assembly 1000 via a tilt angle α, as illustrated in FIGS. 7 and 8B.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A spreader assembly to distribute materials on a ground surface, comprising:
   a container to hold the materials;
   a frame affixed to the container;
   a beater assembly supported by the frame that receives the materials from the container and processes the materials to obtain processed materials, the beater assembly including:
      first and second rotating elements that rotate around first and second axes, extend along a rotating element length in a longitudinal direction substantially parallel to the first and second axes, and blend the materials to produce the processed materials; and
      a fixed deflector that extends in the longitudinal direction along the rotating element length and in a transversal direction, perpendicular to the longitudinal direction, between a head of the fixed deflector and a tail of the fixed deflector to restrict the materials entering a dead zone separating the first and second rotating elements preventing the formation of agglomerates in the processed materials; and
   a spinner assembly which receives the processed materials and expulses the processed materials from the frame onto the ground surface,
   wherein a portion of the fixed deflector intersects a line between centers of the first and second axes extending in a normal direction which is perpendicular to the longitudinal direction and to the transversal direction,
   wherein a first side of the frame supports a first longitudinal end of the first rotating element, a first longitudinal end of the second rotating element, and a first longitudinal end of the fixed deflector, and a second side of the frame supports a second longitudinal end of the first rotating element, a second longitudinal end of the second rotating element, and a second longitudinal end of the fixed deflector,
   wherein the fixed deflector is only supported by the first side of the frame and the second side of the frame,
   wherein the first and second axes of the first and second rotating elements are horizontal,
   wherein the spinner assembly rotates about an axis that is substantially perpendicular to the first and second rotating elements,
   wherein the first rotating element is positioned substantially vertically above the second rotating element,
   wherein the head is located in front of a center plane that contains the first and second axes, and
   wherein the head has a rounded edge that points towards the container and angular edges that face each rotating element.

2. The spreader assembly as claimed in claim 1, wherein the tail includes a first trailing surface that faces upward and a second trailing surface that faces downward.

3. The spreader assembly as claimed in claim 2, wherein the first trailing surface has one of a flat shape, a concave shape, and a convex shape; and the second trailing surface has a concave shape.

4. The spreader assembly as claimed in claim 1, further comprising another deflector located above the fixed deflector.

5. The spreader assembly as claimed in claim 4, wherein the fixed deflector and the another deflector have identical cross section.

6. The spreader assembly as claimed in claim 4, wherein the another deflector includes a second head located upstream to the second rotating element.

7. The spreader assembly as claimed in claim 6, wherein the second head has one of a spheroidal cross section, a triangular cross section, and lozenge-shaped cross section.

8. The spreader assembly as claimed in claim 7, wherein the second head has a sharp edge that faces the container.

9. The spreader assembly as claimed in claim 6, wherein the fixed deflector includes a first tail that extends the first head in a downstream direction between the first rotating element and the second rotating element, the first tail having a first upper trailing surface that faces the second rotating element and a first lower trailing surface that faces the first rotating element; and the another deflector includes a second tail that extends the second head in the downstream direction above the second rotating element and having a second lower trailing surface that faces the second rotating element.

10. The spreader assembly as claimed in claim 9, wherein the first upper trailing surface has one of a flat shape, a concave shape, and a convex shape; the first lower trailing surface has a concave shape; and the second lower trailing surface is parallel to the first trailing surface.

11. The spreader assembly as claimed in claim 1, wherein the fixed deflector extends in the normal direction.

12. A spreader assembly to distribute materials on a ground surface, comprising:
   a container to hold the materials;
   a frame affixed to the container;
   a beater assembly supported by the frame that receives the materials from the container and processes the materials to obtain processed materials, the beater assembly including:
      first and second rotating elements that rotate around first and second axes, extend along a rotating element length in a longitudinal direction substantially parallel to the first and second axes, and blend the materials to produce the processed materials; and
      a fixed deflector that extends in the longitudinal direction along the rotating element length and in a transversal direction, perpendicular to the longitudinal direction, between a head of the fixed deflector and a tail of the fixed deflector to restrict the materials entering a dead zone separating the first and second rotating elements preventing the formation of agglomerates in the processed materials; and
   a spinner assembly which receives the processed materials and expulses the processed materials from the frame onto the ground surface,
   wherein a portion of the fixed deflector intersects a line between centers of the first and second axes extending in a normal direction which is perpendicular to the longitudinal direction and to the transversal direction,
   wherein a first side of the frame supports a first longitudinal end of the first rotating element, a first longitudinal end of the second rotating element, and a first longitudinal end of the fixed deflector, and a second side of the frame supports a second longitudinal end of the first rotating element, a second longitudinal end of the second rotating element, and a second longitudinal end of the fixed deflector,
   wherein the fixed deflector is only supported by the first side of the frame and the second side of the frame,
   wherein the first and second axes of the first and second rotating elements are horizontal,
   wherein the spinner assembly rotates about an axis that is substantially perpendicular to the first and second rotating elements,
   wherein the first rotating element is positioned substantially vertically above the second rotating element, wherein the head is located in front of a center plane that contains the first and second axes, wherein the tail includes a first trailing surface that faces upward and a second trailing surface that faces downward, and wherein the first trailing surface has one of a flat shape, a concave shape, and a convex shape; and the second trailing surface has a concave shape.

13. The spreader assembly as claimed in claim 12, further comprising another deflector located above the fixed deflector.

14. The spreader assembly as claimed in claim 13, wherein the another deflector includes a second head located upstream to the second rotating element.

15. The spreader assembly as claimed in claim 14, wherein the second head has one of a spheroidal cross section, a triangular cross section, and lozenge-shaped cross section.

16. The spreader assembly as claimed in claim 15, wherein the second head has a sharp edge that faces the container.

17. The spreader assembly as claimed in claim 13, wherein the fixed deflector and the another deflector have identical cross section.

18. The spreader assembly as claimed in claim 14, wherein the first trailing surface of the fixed deflector faces the second rotating element and the second trailing surface of the fixed deflector faces the first rotating element; and the another deflector includes a second tail that extends the second head in the downstream direction above the second rotating element and has a second lower trailing surface that faces the second rotating element.

19. The spreader assembly as claimed in claim 18, wherein the second lower trailing surface is parallel to the first trailing surface of the fixed deflector.

20. The spreader assembly as claimed in claim 12, wherein the fixed deflector extends in the normal direction.

* * * * *